United States Patent Office 3,508,144
Patented Apr. 21, 1970

3,508,144
COMPARING PEAK AMPLITUDES OF TEST SIGNAL PULSES WITH SIGNALS OCCURRING DURING THE TIME INTERVAL THEREBETWEEN AS A MEASURE OF TRANSMISSION LINE QUALITY
Hans Ferdinand Mayer, 9c Heilmannstrasse,
8 Munich-Solln, Germany
Filed May 5, 1967, Ser. No. 636,522
Claims priority, application Germany, May 9, 1966,
S 103,695
Int. Cl. G01r 27/00
U.S. Cl. 324—57      2 Claims

ABSTRACT OF THE DISCLOSURE

A process for the supervision of transmission lines, to determine transmission line quality. Successive time spaced test signal pulses are fed to the input of the transmission line being supervised, said line having predetermined band width characteristics. The peak amplitudes of the test signal pulses are detected and measured at the output of the transmission line, and the peak amplitude of any signals occurring during the time interval therebetween are separately detected and measured. The detected signals are then evaluated to determine the ratio therebetween, the ratio being indicative of transmission line quality as determined by factors such as distortion caused by the line and noise signals, etc.

CROSS REFERENCE TO RELATED APPLICATION

Applicant claims priority from German application Ser. No. S 103,695, filed May 9, 1966, in Germany.

BACKGROUND OF THE INVENTION

Field of the invention

The invention relates to the supervision of transmission lines during their free conditions, to determine the quality of signal transmission by evaluating test signal pulses transmitted thereby. Successive time spaced test signal pulses are fed to one end of the transmission line being supervised, and the maximum amplitudes thereof are detected and measured at the other end of the transmission line. Further, the maximum amplitudes of any disturbance voltages occurring between successive test signal pulses are separately detected and measured. The ratio of the maximum amplitudes of the transmitted test signal pulses and the disturbance voltages, comprises a measurement of the transmission quality of the transmission line.

Prior art

The prior art teaches processes for determining the quality of transmission associated with transmission lines, so that transmission lines of low quality, that is, those in which transmitted signals are distored to an unacceptable degree, may be identified and will not be utilized for the transmission of signals that are desired to be transmitted relatively free from distortion. For example, when transmitting signals that occur in rapid pulse succession form, it is desirable not to utilize or seize transmission lines of low quality, when other high quality transmission lines are free. A first prior art process for determining transmission line quality, provides for the measurement of distortions resulting from transmission line attenuation and transmission time of the transmitted signals. This provides for the evaluation of the beginning and end of each signal pulse received at the end of the transmission line. A fixed pulse raster is used, and the received signals are compared thereto to determine pulse deviation therefrom, which represents a measurement of the linear distortion of the transmitted pulse caused by the transmission line. However, a disadvantage of this process is that the transmitted pulse must be measured precisely at the beginning and end thereof, and the comparison process wherein it is compared to the fixed pulse raster, necessitates the utilization of complicated relatively expensive apparatus. Further, it can only be used when pulses are actually transmitted by the transmission line at regular intervals.

A second process for measuring the quality of transmission lines, provides for the transmission of test signals by a transmission line during its free condition. The peak amplitude of the test signal is then compared to its effective value, which comprises a measure of the distortions caused by the transmission line. Although this particular process is less expensive than the first described prior art process, it is disadvantageous to use because the ratio of the effective value to the peak amplitude value of the test signal is ordinarily relatively low and the effective value of the test signal is varied only slightly by the disturbance voltages. Therefore, it is difficult to obtain an accurate determination or transmission line quality, without the use of extremely sensitive and hence relatively expensive apparatus.

SUMMARY OF THE INVENTION

These and other objects and defects of prior art processes are solved by the present invention. The process described herein provides for feeding a test signal comprising successive time spaced pulses to the input of the transmission line being supervised. The peak amplitude of the test signal received at the output of the transmission line is detected and measured. Further, the peak amplitude of any disturbance voltages occurring between successive time spaced pulses is separately detected and measured. The ratio of the peak amplitudes of the test signal and the disturbance voltages provides an indication of the transmission line quality.

The transmission line has a predetermined finite bandwidth, and the time duration of the received test signal can be determined therefrom. Thus, the maximum or peak amplitude of the received test signal is measured during this time interval. Further, the disturbance voltages occurring between the time intervals associated with received transmitted test signals, are detected and their peak voltage is determined. Thus, the detection and measurement of the peak amplitude of the received test signal, is separate from the detection and measurement of the peak amplitude of any disturbance voltages. Hence, an accurate determination of transmission line quality can be made by determining the ratio between the two. This determination is made more reliable by the fact that the peak amplitude of the test signal is ordinarily of much greater relative amplitude than the peak amplitude of the disturbance voltages.

DETAILED DESCRIPTION OF THE INVENTION

Figure 1:
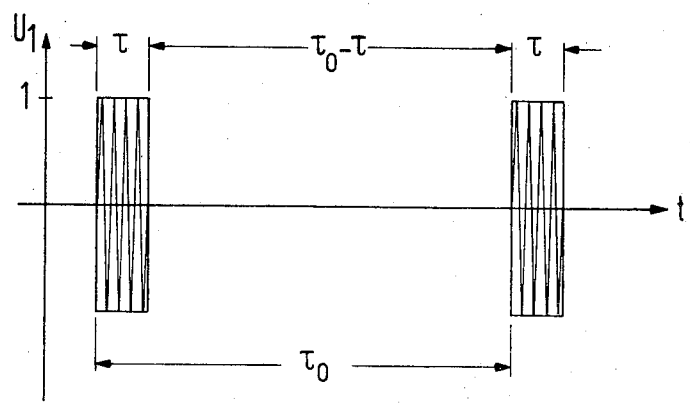
FIGURE 1 is a graph illustrating a plurality of time spaced test signals fed to the transmission line to be supervised.

FIGURE 1 is a graph showing the constant amplitude test signals comprising alternating current signals of pulse duration time $t$, that are successively fed in time spaced manner to the transmission line being tested. Thus, alternating current signals of pulse time duration $t$, are applied to the transmission line being supervised at periodic time intervals $t_0$, by conventional generator apparatus (not shown).

Figure 2:
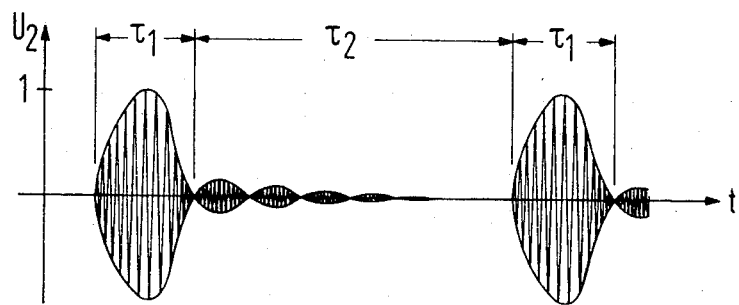
FIGURE 2 is a graph illustrating the signals received at the end of the transmission line being supervised, and shows the relationship between the peak amplitudes of the test signal and the disturbance voltages.

FIGURE 2 illustrates the amplitude versus time characteristics of the transmitted test signal, and more particularly the signals received at the end of a transmission line having a predetermined finite bandwidth equal to B. Because of bandwidth limitation, portions of the test signal pulses illustrated in FIGURE 1 are delayed during transmission. Thus, the pulse duration time of the test signals received at the end of the transmission line has been increased to $t_1$, where $t_1$ equals $t+1/B$.

In a distortion free transmission line that is not affected by outside disturbances, disturbance voltages would not occur during time interval $t_2$ (where $t_2=t_0 \cdot t_1$) between successive test signal pulses. However, as illustrated in FIGURE 2, such disturbance voltages may be present, because of parasitic noises, and reflection of signals being transmitted by the transmission line, for example. It is seen that the voltage of such disturbances normally decay with time.

Figure 3:
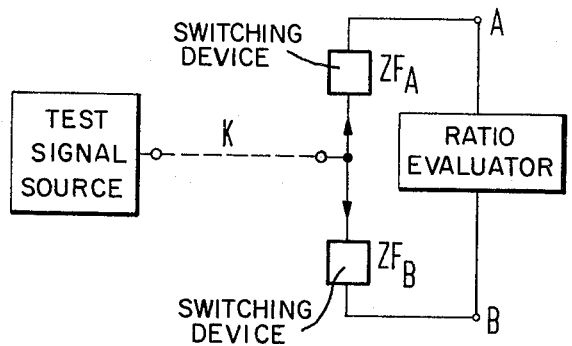
FIGURE 3 is an electrical schematic diagram of one apparatus that may be utilized to carry out the process of the invention.

FIGURE 3 illustrates one circuit, that may be utilized to practice the process of the invention. Switching devices $ZF_A$ and $ZF_B$ are connected in parallel to one end of transmission line K that is being tested. The source of test signals is connected to the other end of transmission line K. Time switching devices $ZF_A$ and $ZF_B$ are timed, so that time switching device $ZF_A$ completes the electrical connection between transmission line K and terminal A during time period $t_1$, and time switching device $ZF_B$ completes the connection between transmission line K and terminal B during time period $t_2$. Thus, time switching devices $ZF_A$ and $ZF_B$ are alternatively switched between the closed and open conditions.

Switching devices $ZF_A$ and $ZF_B$ further comprise peak voltage amplitude detectors, that provide an indication of the maximum or peak voltage amplitudes occurring during time intervals $t_1$ and $t_2$, respectively. The peak voltage amplitude measured during time interval $t_2$ is a measure of the sum of disturbance voltages produced by various disturbances in the transmission line. The energy of the test signal pulses comprises a relatively short time spectrum provided various distortions due to transmission line attenuation and travel time characteristics remains low. However, if the test signal pulse time spectrum is changed during transmission, indicating distortion thereof, proportionately greater energy portions of the test signal pulse are delayed in transmission and are subjected to amplitude variations. Such time delayed test signal pulse energy portions are received at the end of the transmission line, during time interval $t_2$, and produce decaying oscillations that are detected by switching device $ZF_B$.

It is also known, that other factors may effect changes in signals transmitted by transmission lines. For example, a transmission line may have non-linear characteristics thereacross. Further, parasitic voltages may also effect and vary the transmitted signal. These are especially effective during the time interval between successive transmitted pulses, because the transmitted pulses are not superposed thereon during this time.

The peak amplitude signals detected by switching devices $ZF_A$ and $ZF_B$ are registered and compared, and conventional apparatus (not shown) is used to evaluate the ratio between utility power and disturbance power as determined by the peak amplitudes of the signals during time intervals $t_1$ and $t_2$, respectively. This ratio provides an indication of transmission line quality.

Thus, this invention utilizes the disturbance voltages produced during the time interval between test signal pulses, and more particularly measures the peak amplitude thereof, and compares it to the peak amplitude of the test signal pulses. By separately detecting and measuring the peak amplitudes of the test signal pulses and the disturbance signal voltages produced during the time intervals therebetween, detection and measurement of the peak amplitude of the disturbance voltage is made more certain. Further, in a distortion-free line in which no attenuation or time delay of transmitted signals is effected by the transmission line, the disturbance voltages measured during time intervals between successive test signal pulses, is not influenced thereby as is the effective value of the test signal pulses. Therefore, a higher ratio value is obtained according to the process taught by this invention, compared to the second prior art process described heretofore. This causes a corresponding increase in the accuracy of the determination of transmission line quality because evaluation apparatus is generally more sensitive to higher ratio values.

I claim:
1. A method for determining the transmission quality of a transmission line comprising:
applying successive time spaced test signal pulses to one end of the transmission line,
detecting the peak amplitudes of the time spaced test signal pulses received at the other end of the transmission line to produce a first detected signal,
detecting the peak amplitude of disturbance signals received at the other end of the transmission line within the time interval between reception of successive time spaced test signal pulses to produce a second detected signal,
evaluating the first and second detected signals to provide an indication of the ratio therebetween.

2. A method for determining the transmission quality of a transmission line as recited in claim 1, the evaluating of the first and second detected signals comprising:
registering the first and second detected signals to produce first and second registered signals, respectively,
comparing the first and second registered signals, to provide an indication of the ratio therebetween.

References Cited
UNITED STATES PATENTS

| | | | |
|---|---|---|---|
| 2,632,792 | 3/1953 | Selz | 324—57 |
| 2,888,638 | 5/1959 | Nelson et al. | 324—.5 |
| 3,076,933 | 2/1963 | Negrete | 324—140 |

EDWARD E. KUBASIEWICZ, Primary Examiner

U.S. Cl. X.R.

179—175.3; 324—140